United States Patent [19]

Cooper

[11] Patent Number: 4,793,682
[45] Date of Patent: Dec. 27, 1988

[54] FIBER OPTIC SPLICE AND FIBER HOLDER AND HOUSING THEREFOR

[75] Inventor: David A. Cooper, Logantown, Pa.

[73] Assignee: GTE Products Corporation, Stamford, Conn.

[21] Appl. No.: 141,818

[22] Filed: Jan. 11, 1988

[51] Int. Cl.[4] .............................................. G02B 6/36
[52] U.S. Cl. .................................................. 350/96.20
[58] Field of Search ............... 350/96.15, 96.20, 96.21, 350/96.22, 96.23

[56] References Cited

U.S. PATENT DOCUMENTS

| 4,666,240 | 5/1987 | Caron et al. | 350/96.20 |
| 4,685,764 | 8/1987 | Hoffer et al. | 350/96.20 |
| 4,702,551 | 10/1987 | Coulombe | 350/96.20 |
| 4,722,585 | 2/1988 | Boyer | 350/96.20 |

FOREIGN PATENT DOCUMENTS

| 3532312 | 3/1987 | Fed. Rep. of Germany | 350/96.23 |
| 55-45053 | 3/1980 | Japan | 350/96.21 |
| 58-50508 | 3/1983 | Japan | 350/96.20 |

Primary Examiner—John D. Lee
Attorney, Agent, or Firm—William H. McNeill

[57] ABSTRACT

A fiber optic splice and fiber holder and a housing for one or more of such holders. Each holder includes spool-type apparatus for removing slack in two fibers joined by a splice. Each housing accommodates a plurality of such holders, each of which is readily inserted into and removed from the housing.

17 Claims, 3 Drawing Sheets

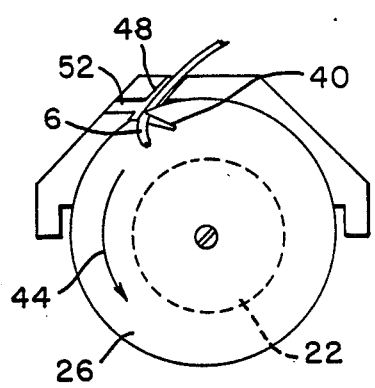
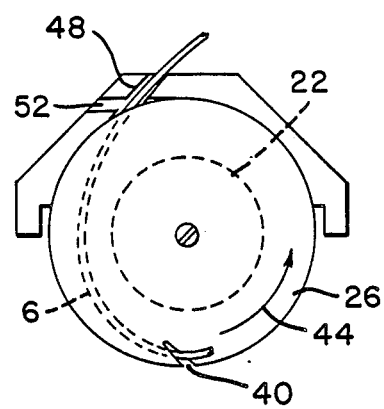
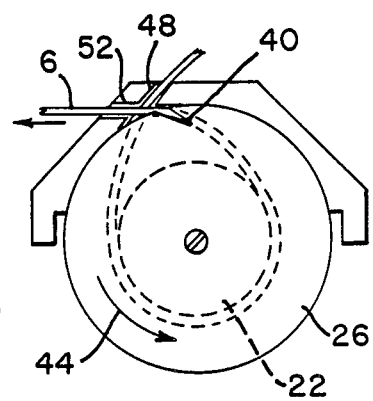
FIG. 4A  FIG. 4B  FIG. 4C
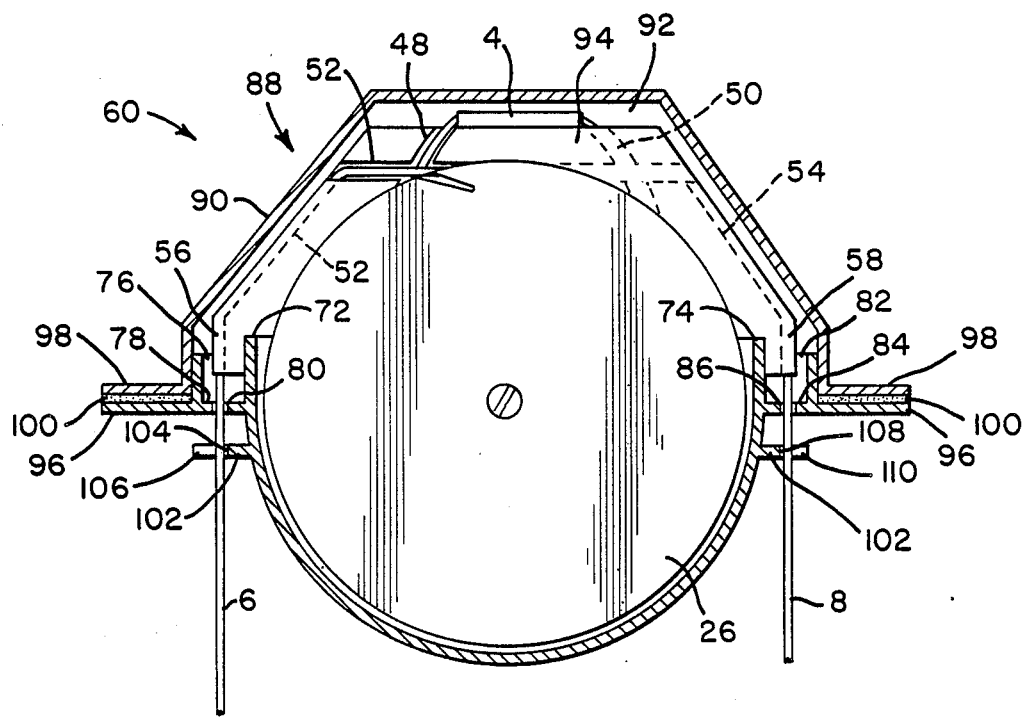
FIG. 6

FIBER OPTIC SPLICE AND FIBER HOLDER AND HOUSING THEREFOR

BACKGROUND OF THE INVENTION

1. Field of the Invention

The present invention relates to a splice and fiber holder, and housing for one or more of such holders. Each splice and fiber holder is used to hold a splice which connects a first fiber and a second fiber, and to store an excessive length of such first and second fibers.

2. Description of Prior Art

Presently, most fiber optic splices are contained in a housing. However, heretofore provision has not been made for storing, or otherwise holding, its attached fibers. Rather, holding of such fibers is usually effected by attaching the splice housing to a tray or the like and allowing the fibers to merely coil around the perimeter of such tray. Such an arrangement often leads to one fiber overlapping itself or another fiber. In addition, uncontrolled coiling also causes a fiber bend radius which is too sharp. The result often leads to higher attenuation of the fiber than is desirable. Uncontrolled bending also will cause a fiber to bend to a degree which is sharper than the minimum recommended by the fiber manufacturer thereby causing premature fatigue failure, that is, premature fiber breakage. In addition, there is often more than one splice on a tray thereby tending to cause the unprotected fibers to become entangled with those of other splices thereby making servicing of a particular splice more difficult.

Another concern particularly evident in the fiber optic telecommunications industry is that adequate means be provided to protect spliced cable ends from the elements yet provide ready access for servicing. Presently, this is accomplished by means of a splice case and by the use of an organizer mounted outside such splice case. Most of such prior art organizers are of the tray design. In using such trays, proper cable guiding which would allow for proper separation of individual fibers is not provided. The result will be sharp bending and fiber entanglement and the problems associated therewith as discussed above. In addition, it will be difficult, if possible at all, to use an encapsulant inside the splice case since there is presently no known way to keep the encapsulant away from the various splices.

It is desirable to provide a holder which contains a splice and its attached fibers.

It is further desirable to provide such a holder which prevents fiber overlapping.

It is also desirable to provide such a holder which controls the coiling of fibers attached to a splice to control fiber bend radius.

It is desirable to provide such a holder which prevents fiber entanglement.

It is also desirable to provide a housing for protecting spliced cable ends from the elements yet provide ready access for servicing.

It is further desirable to provide such a housing which prevents fiber overlapping and entanglement and controls fiber bend radius.

It is also desirable to provide such a housing which allows for the use of an encapsulant and yet isolates the various splices in such housing from such encapsulant.

SUMMARY OF THE INVENTION

This invention achieves these and other objects by providing a splice and fiber holder useful in holding a splice used to connect a first fiber and a second fiber and useful in storing an excessive length of such first and second fibers. The holder comprises a center section having a first surface, an opposing second surface, a peripheral surface extending between the first surface and the second surface, and an axis of rotation extending in a direction from the first surface towards the second surface. A first hub is provided adjacent the first surface and extending away from the first surface along the axis of rotation, and a second hub is provided adjacent the second surface and extending away from the second surface along the axis of rotation. A first side plate is attached to the first hub for rotation relative to the first surface and the first hub about the axis of rotation, and a second side plate is attached to the second hub for rotation relative to the second surface and the second hub about the axis of rotation. Means are positioned at the peripheral surface of the center section for holding the splice, when in use, such that the fibers will extend from the holding means. Means are positioned at the first surface adjacent the holding means for directing, when in use, the first fiber from the holding means towards the engaging means of the first side plate. Means are also positioned at the second surface adjacent the holding means for directing, when in use, the second fiber from the holding means toward the engaging means of the second side plate. Means are provided at a peripheral edge of the first side plate for engaging, when in use, the first fiber extending from the holding means such that as the first side plate is rotated about the axis of rotation the first fiber is wrapped about the first hub. Further, means are also provided at a periphery edge of the second side plate for engaging, when in use, the second fiber extending from the holding means such that as the second side plate is rotated about the axis of rotation the second fiber is wrapped about the second hub.

In addition, a housing is provided for containing a plurality of such splice and fiber holders. In this manner, apparatus can be provided including a plurality of housed splice and fiber holders each of which can be used in housing a splice used to connect a first fiber and a second fiber and for storing an excessive length of such first and second fibers.

BRIEF DESCRIPTION OF THE DRAWINGS

FIGS. 4A to 4C schematically depict sequential operation of the splice and fiber holder of the present invention;

DESCRIPTION OF THE PREFERRED EMBODIMENT

Figure 1:
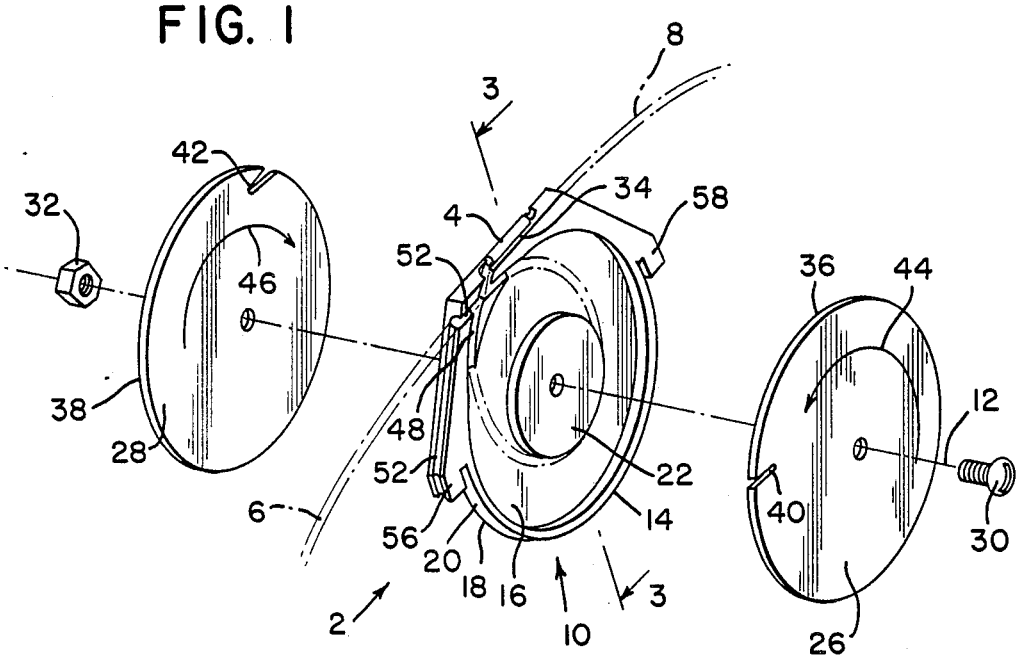
FIG. 1 is an exploded perspective view of the splice and fiber holder of the present invention.
Figure 2:
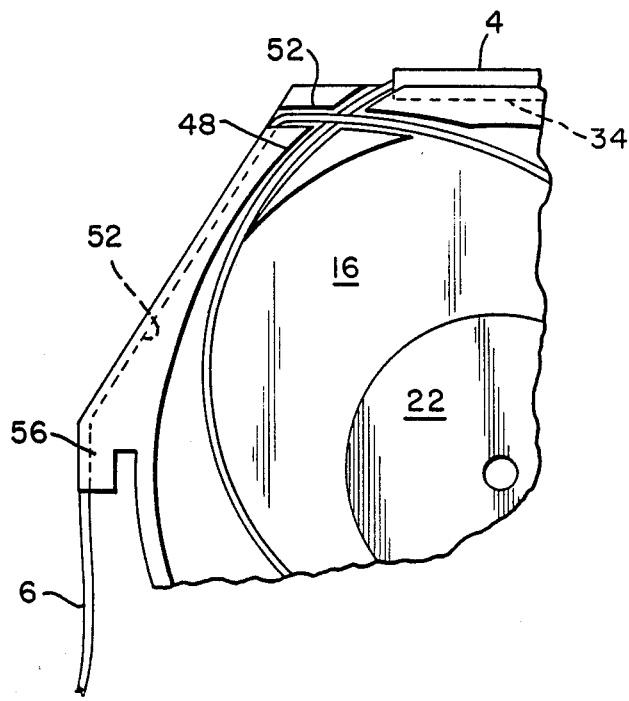
FIG. 2 is an enlarged partial view of the main body portion of FIG. 1.
Figure 3:
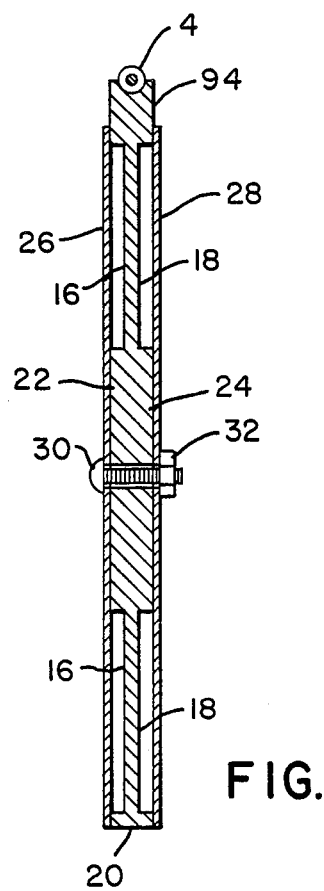
FIG. 3 is a sectional view of FIG. 1 along 3—3.

The embodiment of this invention which is illustrated in FIGS. 1 to 4 is particularly suited for achieving the objects of this invention. FIGS. 1 to 4 depict a splice and fiber holder 2 useful in holding a splice 4 used to connect a first fiber 6 and a second fiber 8 and useful in storing an excessive length of fibers 6 to 8. Holder 2 includes a main body portion 10 having an axis of rotation 12. Main body portion 10 includes a center section 14 having a first surface 16, an opposing second surface 18, and a peripheral surface 20 extending between first surface 16 and second surface 18. Axis of rotation 12 extends in a direction from first surface 16 towards second surface 18, as depicted in FIG. 1.

A first hub 22, adjacent surface 16, extends away from surface 16 along axis of rotation 12. In a like manner, a second hub 24, adjacent surface 18, extends away from surface 18 along axis of rotation 12.

A first side plate 26 is attached to the first hub 22 for rotation relative to first surface 16 and first hub 22 about axis of rotation 12. In a like manner, a second side plate 28 is attached to the second hub 24 for rotation relative to the second surface 18 and second hub 24 about axis of rotation 12. To this end, a coupling means such as bolt 30 and nut 32 are provided.

Means are positioned at the peripheral surface 20 of center section 10 for holding the splice 4, when holder 2 is in use, such that first fiber 6 and second fiber 8 will extend from such holding means. For example, in the drawings such holding means forms part of the peripheral surface 20 and includes an elongated groove 34 into which splice 4 has been inserted.

Means are positioned at a peripheral edge 36 of first side plate 26 for engaging first fiber 6 extending from the holding means such that as the first side plate is rotated about axis of rotation 12 the first fiber 6 is wrapped about the first hub 22. In a like manner, means are positioned at a peripheral edge 38 of second side plate 28 for engaging second fiber 8 extending from the holding means such that as the second side plate is rotated about axis of rotation 12 the fiber 8 is wrapped about the second hub 24. In the preferred embodiment, such engaging means of the first side plate 26 includes a first notch 40 in peripheral edge 36, and such engaging means of the second side plate 28 includes a second notch 42 in peripheral edge 38.

Preferably, the first side plate 26 is rotatable in a first direction such as, for example, direction 44, and the second side plate 28 is rotatable in a second opposite direction such as, for example, direction 46. In the preferred embodiment, first notch 40 extends into side plate 26 in a direction opposite to the direction of rotation of first side plate 26, and second notch 42 extends into side plate 28 in a direction opposite to the direction of rotation of second side plate 28.

Means are positioned at first surface 16 adjacent the holding means for directing first fiber 6 from the holding means towards the engaging means of the first side plate 26, and means are positioned at second surface 18 adjacent the holding means for directing second fiber 8 from the holding means towards the engaging means of the second side plate 28. For example, a directing means in the form of an elongated groove 48 in first surface 16 directs first fiber 6 from the groove 34 towards the notch 40 of first side plate 26. Similarly, a directing means in the form of a similar elongated groove 50 in second surface 18 directs second fiber 8 from the groove 34 towards the notch 42.

In a like manner, means are positioned at first surface 16 adjacent the holding means for orienting first fiber 6, which has been wrapped about first hub 22, away from hub 22, and means are positioned at second surface 18 adjacent the holding means for orienting second fiber 8, which has been wrapped about second hub 24, away from hub 24. For example, an orienting means in the form of an elongated groove 52 in first surface 16 orients first fiber 6, which has been wrapped about first hub 22, away from hub 22. Similarly, an orienting means in the form of a similar elongated groove 54 in second surface 18 orients second fiber 8, which has been wrapped about second hub 24, away from hub 24.

In the preferred embodiment, first hub 22 is sized such that when in use a pre-determined length of the first fiber 6 will be wound around the first hub in such a manner that when all slack in the first fiber is taken up, the engaging means, such as notch 40 of first side plate 26, will be aligned with the orienting means, such as groove 52, in the first surface 16. Similarly, second hub 24 is sized such that when in use a pre-determined length of the second fiber 8 will be wound around the second hub 24 in such a manner that when all slack in the second fiber is taken up, the engaging means, such as notch 42 of second side plate 28, will be aligned with the orienting means, such as groove 54, in the second surface 18.

The winding of fibers 6 and 8 is effected in the same manner with the exception that whereas with fiber 6, side plate 26 is rotated in direction 44 to wind fiber 6 about hub 22, with fiber 8, side plate 28 is rotated in direction 46 to wind fiber 8 about hub 24. Therefore, operation will be described only with respect to fiber 6. In operation of the splice and fiber holder 2, a splice 4 is made to connect fiber optics 6 and 8 in a known manner. Splice 4 is then placed in groove 34, and side plate 26 is rotated in direction 44 until notch 40 is aligned with entrance groove 48. Fiber 6 is then fed down the elongated groove 48 into notch 40 as depicted in FIG. 4A. Side plate 26 is then further rotated in direction 44 as depicted in FIG. 4B causing the fiber 6 to be partially wound towards hub 22. By continuing to rotate side plate 26 in direction 44 as depicted in FIG. 4C, and by properly sizing the circumference of hub 22, a pre-determined length of fiber 6 will be wound around hub 22 such that when notch 40 is aligned with the groove 52 all of the slack in fiber 6 will have been removed as the fiber 6 is guided away from hub 22 by means of the elongated exit groove 52. The procedure is repeated for fiber 8 so that fiber is wound in a similar manner upon hub 24 such that all of the slack in fiber 8 is removed, and fiber 8 is guided away from hub 24 by means of an elongated groove 54. In this manner, a splice and fiber holder is provided which contains the splice and its attached fibers. By removing all fiber slack in a controlled manner fiber overlapping and entanglement is prevented. By properly sizing the hubs, all fiber slack can be removed, and coiling of the fibers is controlled in such a manner as to control fiber bend radius.

In the preferred embodiment, holder 2 is designed so that it can be housed in the housing of the present invention as described hereinafter, along with one or more other similar holders 2. To this end, the holder 2 includes means positioned at the peripheral surface 20 for coupling the holder to such a housing. In the preferred embodiment, the coupling means includes a first arm 56 extending from the peripheral surface 20 at one position of such surface and a second arm 58 extending from peripheral surface 20 at an opposite portion of such surface. It will be noted that a respective exit groove 52, 54 extends along surface 20 including first arm 56 for fibr 6 and second arm 58 for fiber 8.

Figure 5:
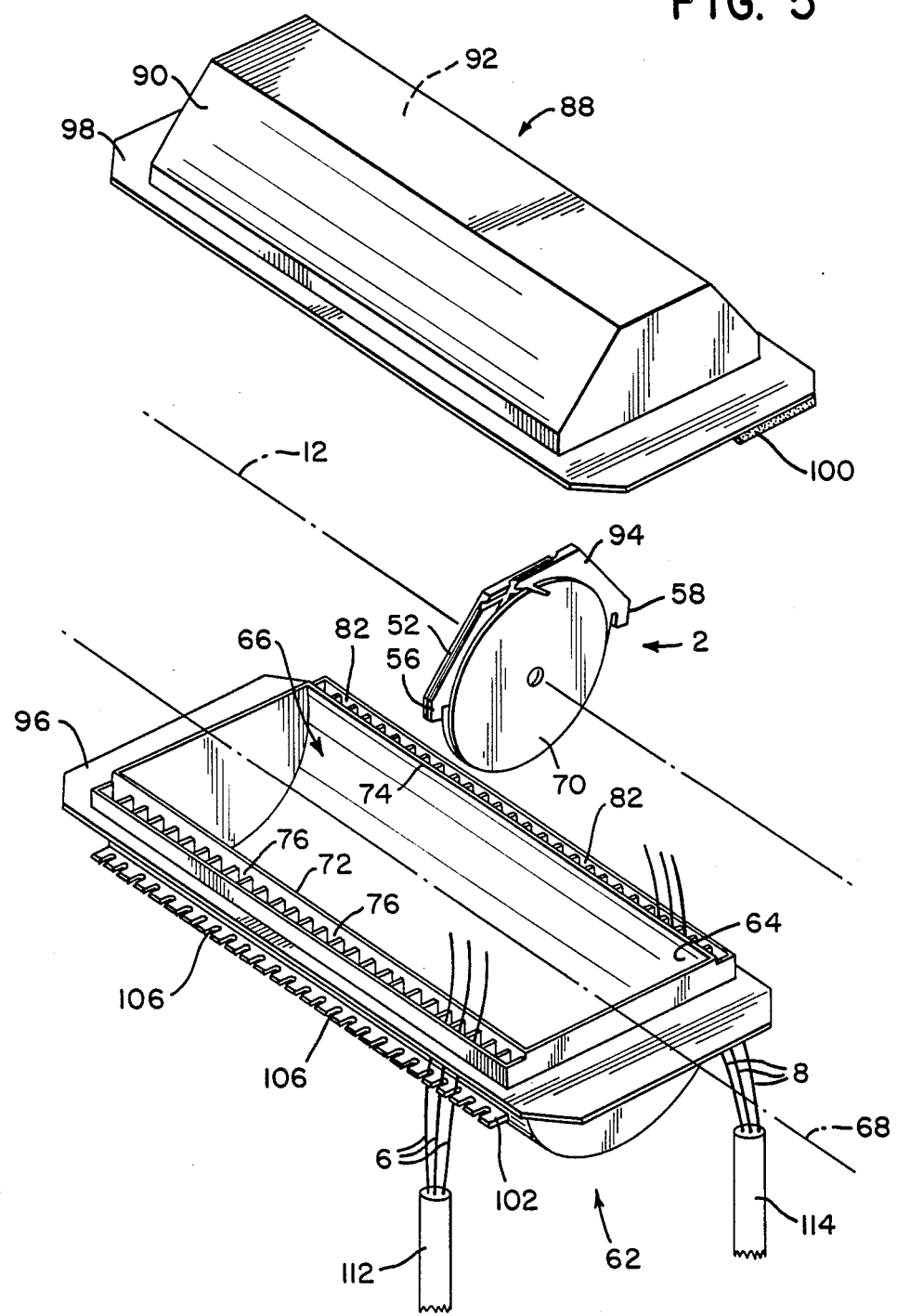
FIG. 5 is an exploded perspective view of the housing for containing a plurality of splice and fiber holders; and, FIG. 6 is a sectional view of FIG. 5 depicting the holder in a closed housing.

The housing 60 of the present invention is depicted in FIGS. 5 and 6 and includes a first housing portion 62 including at least one wall 64 forming a first cavity 66. Cavity 66, which extends in a longitudinal direction identified at 68, is provided for containing a first portion such as the lower portion 70 of each splice and fiber holder 2 of a plurality of splice and fiber holders 2 which can be inserted into housing 60 as described herein. Each holder 2 is inserted into cavity 66 such that the longitudinal direction identified as 68 and each respective axis of rotation 12 of each respective holder 2 extend in the same direction as depicted in FIG. 5. The first housing portion 62 includes a first edge 72 on one side of cavity 66 and a second edge 74 on an opposite side of cavity 66. Edges 72 and 74 are parallel to the longitudinal direction identified at 68.

First edge 72 comprises a plurality of first mounting slots 76 each of which is of a size and configuration coincident with a respective first arm 56 of holder 2 for receiving a respective first arm 56. Each slot 76 includes a base 78 having an aperture 80 extending therethrough. In a like manner, second edge 74 comprises a plurality of second mounting slots 82 each of which is of a size and configuration coincident with a respective second arm 58 of holder 2 for receiving respective arm 58. Each slot 82 includes a base 84 having an aperture 86 extending therethrough.

The housing 60 also includes a second housing portion 88 detachably fastened to the first housing portion and covering cavity 66. In the preferred embodiment the second housing portion 88 includes at least one wall 90 forming a second cavity 92 extending in the longitudinal direction identified at 68 when the second housing portion is fastened to the first housing portion. Second cavity 92 serves the purpose of containing a second portion 94 of each holder 2.

In the embodiment of FIGS. 5 and 6 the first housing portion 62 includes a flange 96 extending therefrom, and the second housing portion 88 includes a corresponding flange 98 extending therefrom. Flanges 96 and 98 engage each other when the second housing portion 88 is fastened to the first housing portion 62. Means are provided associated with flanges 96 and 98 for fastening flanges 96 and 98 together. For example, a sealant, partially depicted at 100, can be provided which serves to adhere the two flanges together and to seal the housing.

In the preferred embodiment, a first fiber separator 102 extends from first housing portion 62 and is oriented in the longitudinal direction identified at 68. Fiber separator 102 includes surfaces 104 which form a plurality of fiber binding openings 106 each of which is in alignment with a respective first aperture 80. A corresponding second fiber 102 separator extends from first housing portion 62 and includes surfaces 108 which form a plurality of fiber binding openings 110 each of which is in alignment with a respective second aperture 86.

In use, the first housing portion is positioned as desired. For example, first housing portion 62 can be placed in a splice case (not shown) and clamped in place. Each fiber 6 of a first cable 112 to be spliced to a corresponding fiber 8 of a second cable 114 is fed upward, viewing FIG. 5, and through a respective fiber binding opening 106 and a respective aperture 80 associated with a respective first mounting slot 76. Similarly, each fiber 8 of second cable 114 is fed upward and through a respective fiber binding opening 110 and a respective aperture 86 associated with a respective second mounting slot 82. When all fibers are in place, the ends of respective pairs of fibers 6 and 8 are stripped back to the sealing flange 96. Each mating pair of fibers 6 and 8 is then spliced with a splice 4 in a known manner, one at a time. After a pair of fibers 6 and 8 is spliced, the splice 4 is positioned in groove 34 of holder 2 and the slack in fibers 6 and 8 is taken up as described above. The lower portion 70 of holder 2 is then positioned in cavity 66 such that arm 56 extends into a slot 76 and arm 58 extends into a slot 82 to secure the holder 2 in place. Each pair of fibers 6 and 8 is treated in the same manner with a respective holder 2 until all loose fibers have been spliced as desired. Finally, second housing portion 88 is positioned to enclose holders 2 such that the top portion 94 of each holder extends into cavity 92 of the second housing portion. By applying a sealant 100 to the sealing flange 96 or 98 the top half 88 of the housing 60 can be secured to the bottom half 62. If desired the entire housing 60 is then encapsulated by means of, for example, an epoxy-type encapsulant. In this manner a housing is provided by means of which spliced cable ends are protected from the elements yet ready access is provided for servicing. Further, such housing allows for the use of an encapsulant and yet isolates the various splices in the housing from the encapsulant. The housing also prevents fiber overlapping and entanglement and controls fiber bend radius when used with the splice and fiber holder of the present invention.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A splice and fiber holder useful in holding a splice used to connect a first fiber and a second fiber and useful in storing an excessive length of said first fiber and second fiber, comprising:

a center section having a first surface, an opposing second surface, a peripheral surface extending between said first surface and said second surface and an axis of rotation extending in a direction from said first surface towards said second surface;

a first hub adjacent said first surface and extending away from said first surface along said axis of rotation;

a second hub adjacent said second surface and extending away from said second surface along said axis of rotation;

a first side plate attached to said first hub for rotation relative to said first surfce and said first hub about said axis of rotation;

a second side plate attached to said second hub for rotation relative to said second surface and said second hub about said axis of rotation;

means positioned at said peripheral surface of said center section for holding said splice, when in use, such that said first fiber and said second fiber will extend from said holding means;

means at a peripheral edge of said first side plate for engaging, when in use, said first fiber extending from said splice in said holding means such that as said first side plate is rotated about said axis of rotation said first fiber is wrapped about said first hub; and, means at a peripheral edge of said second side plate for engaging, when in use, said second fiber extending from said splice in said holding means such that as said second side plate is rotated about said axis of rotation said second fiber is wrapped about said second hub.

2. The splice and fiber holder of claim 1 further including means positioned at said first surface adjacent said holding means for directing, when in use, said first fiber from said holding means towards said engaging means of said first side plate and means positioned at said second surface adjacent said holding means for directing, when in use, said second fiber from said holding means towards said engaging means of said second side plate.

3. The splice and fiber holder of claim 2 further including means positioned at said first surface adjacent said holding means for orienting, when in use, said first fiber which has been wrapped about said first hub away from said first hub, and means positioned at said second surface adjacent said holding means for orienting, when in use, said second fiber which has been wrapped about said second hub away from said second hub.

4. The splice and fiber holder of claim 3 wherein said first hub is sized such that when in use a pre-determined length of said first fiber will be wound around said first hub in such a manner that when all slack in said first fiber is taken up, said engaging means at said peripheral edge of said first side plate will be aligned with said orienting means positioned at said first surface, and said second hub has been sized such that when in use a pre-determined length of said second fiber will be wound around said second hub in such a manner that when all slack in said second fiber is taken up, said engaging means at said peripheral edge of said second side plate will be aligned with said orienting means positioned at said second surface.

5. The splice and fiber holder of claim 4 wherein said holding means forms a part of said peripheral surface of said center section and includes an elongated groove into which said splice can be inserted.

6. The splice and fiber holder of claim 5 wherein said engaging means of said first side plate includes a first notch in said peripheral edge of said first plate, and wherein said engaging means of said second side plate includes a second notch in said peripheral edge of said second plate.

7. The splice and fiber holder of claim 6 wherein said first side plate is rotatable in a first direction and said second side plate is rotatable in a second opposite direction.

8. The splice and fiber holder of claim 7 wherein said first notch extends into said first side plate in a direction opposite to said first direction and said second notch extends into said second side plate in a direction opposite to said second opposite direction.

9. The splice and fiber holder of claim 8 wherein each of said directing means and each of said orienting means includes an elongated groove in a respective of said first surface and said second surface.

10. The splice and fiber holder of claim 9 further including means positioned at said peripheral surface for coupling said splice and fiber holder to a housing for containing a plurality of said splice and fiber holders.

11. The splice and fiber holder of claim 10 wherein said coupling means includes a first arm extending from said peripheral surface at one position of said peripheral surface and a second arm extending from said peripheral surface at an opposite position of said peripheral surface.

12. A housing for containing a plurality of splice and fiber holders of the type including a main body portion having an axis of rotation, a first arm extending from one position of a peripheral surface of said main body portion and a second arm extending from an opposite position of said peripheral surface, said housing comprising a first housing portion including at least one wall forming a first cavity, extending in a longitudinal direction, for containing a first portion of each splice and fiber holder of said plurality of splice and fiber holders such that said longitudinal direction and each respective axis of rotation extend in the same direction, said first housing portion including a first edge on one side of said cavity and a second edge on an opposite side of said cavity, said first edge and said second edge being parallel to said longitudinal direction, said first edge comprising a plurality of first mounting slots each of which is of a size and configuration coincident with a respective first arm for receiving a respective first arm and each of which includes a respective first base having a respective first aperture therethrough, and said second edge comprising a plurality of second mounting slots each of which is of a size and configuration coincident with a respective second arm for receiving a respective second arm and each of which includes a respective second base having a respective second aperture therethrough, said housing further including a first fiber separator extending from said first housing portion and oriented in said longitudinal direction, said first fiber separator including first surfaces forming a plurality of first fiber binding openings each of which is in alignment with a respective first aperture, and a second fiber separator extending from said first housing portion and oriented in said longitudinal direction, said second fiber separator including second surfaces forming a plurality of second fiber binding openings each of which is in alignment with a respective second aperture.

13. Apparatus including a plurality of housed splice and fiber holders each of which can be used in holding a splice used to connect a first fiber and a second fiber and for storing an excessive length of said first fiber and said second fiber, each splice and fiber holder of said plurality of splice and fiber holders including a main body portion having an axis of rotation, a first arm extending from one position of a peripheral surface of said main body portion and a second arm extending from an opposite position of said peripheral surface, said apparatus comprising:

a first housing portion including at least one wall forming a first cavity, extending in a longitudinal direction, for containing a first portion of each splice and fiber holder of said plurality of splice and fiber holders such that said longitudinal direction and each respective axis of rotation extend in the same direction, said first housing portion including a first edge on one side of said cavity and a second edge on an opposite side of said cavity, said first edge and said second edge being parallel to said longitudinal direction, said first edge comprising a plurality of first mounting slots each of which is of a size and configuration coincident with a respective first arm for receiving a respective first arm and each of which includes a respective first base having a respective first aperture therethrough, and said second edge comprising a plurality of second mounting slots each of which is of a size and configuration coincident with a respective second arm for receiving a respective second arm and each of which includes a respective second base having a respective second aperture therethrough, a plurality of said splice and fiber holders each of which includes one of said main body portions, each of said main body portions comprising:
a center section having a first surface, an opposing second surface, a peripheral surface extending between said first surface and said second surface and an axis of rotation extending in a direction from said first surface towards said second surface;
a first hub adjacent said first surface and extending away from said first surface along said axis of rotation;
a second hub adjacent said second surface and extending away from said second surface along said axis of rotation;
a first side plate attached to said first hub for rotation relative to said first surface and said first hub about said axis of rotation;
a second side plate attached to said second hub for rotation relative to said second surface and said second hub about said axis of rotation;
means positioned at said peripheral surface of said center section for holding said splice, when in use, such that said first fiber and said second fiber will extend from said holding means;
means at a peripheral edge of said first side plate for engaging, when in use, said first fiber extending from said holding means such that as said first side plate is rotated about said axis of rotation said first fiber is wrapped about said first hub;
means at a peripheral edge of said second side plate for engaging, when in use, said second fiber extending from said holding means such that as said second side plate is rotated about said axis of rotation said second fiber is wrapped about said second hub;
means positioned at said first surface adjacent said holding means for directing, when in use, said first fiber from said holding means towards said engaging means of said first side plate;
means positioned at said second surface adjacent said holding means for directing, when in use, said second fiber from said holding means towards said engaging means of said second side plate; and,
means positioned at said first surface adjacent said holding means for orienting, when in use, said first fiber which has been wrapped about said first hub away from said first hub;
means positioned at said second surface adjacent said holding means for orienting, when in use, said second fiber which has been wrapped about said second hub away from said second hub; and,
means positioned at said peripheral surface of each main body portion for coupling each splice and fiber holder to said first housing portion, each of said coupling means including a first arm extending from one position of said peripheral surface of a respective main body portion and extending into a respective first mounting slot of said plurality of first mounting slots, and a second arm extending from an opposite position of said peripheral surface of said respective main body portion and extending into a respective second mounting slot of said plurality of second mounting slots.

14. The apparatus of claim 13 further including a second housing portion detachably fastened to said first housing portion and covering said cavity, said second housing portion including at least one wall forming a second cavity, extending in said longitudinal direction, for containing a second portion of each splice and fiber holder of said plurality of splice and fiber holders.

15. The apparatus of claim 14 further including a first fiber separator extending from said first housing portion and oriented in said longitudinal direction, said first fiber separator including first surfaces forming a plurality of first fiber binding openings each of which is in alignment with a respective first aperture, and a second fiber separator extending from said first housing portion and oriented in said longitudinal direction, said second fiber separator including second surfaces forming a plurality of second fiber binding openings each of which is in alignment wth a respective second aperture.

16. The apparatus of claim 15 wherein said holding means forms a part of said peripheral surface of said center section and includes an elongated groove into which said splice can be inserted, said engaging means of said first side plate includes a first notch in said peripheral edge of said first plate, said engaging means of said second side plate includes a second notch in said peripheral edge of said second plate, said first side plate is rotatable in a first direction and said second side plate is rotatable in a second opposite direction, said first notch extends in a direction opposite to said first direction and said second notch extends in a direction opposite to said second opposite direction, and each of said directing means and each of said orienting means include an elongated groove in a respective of said first surface and said second surface.

17. The apparatus of claim 13 wherein said first hub is sized such that when in use a pre-determined length of said first fiber will be wound around said first hub in such a manner that when all slack in said first fiber is taken up, said engaging means at said peripheral edge of said first side plate will be aligned with said orienting means positioned at said first surface, and said second hub has been sized such that when in use a pre-determined length of said second fiber will be wound around said second hub in such a manner that when all slack in said second fiber is taken up, said engaging means at said peripheral edge of said second side plate will be aligned with said orienting means positioned at said second surface.

* * * * *